United States Patent Office 3,780,072
Patented Dec. 18, 1973

3,780,072
3-ENOLETHERS OF $\Delta^1$-3-KETO-5$\alpha$-STEROIDS AND PROCESS FOR THEIR PREPARATION
Rinaldo Gardi, Carate Brianza, and Pier Paolo Castelli, Monza, Italy, assignors to Warner-Lambert Company, Morris Plains, N.J.
No Drawing. Continuation-in-part of application Ser. No. 830,841, June 5, 1969, which is a continuation-in-part of application Ser. No. 640,419, May 22, 1967, both now abandoned. This application Nov. 26, 1971, Ser. No. 202,572
Claims priority, application Germany, Nov. 18, 1966, P 15 93 698.8
Int. Cl. C07c 169/32
U.S. Cl. 260—397.45                27 Claims

ABSTRACT OF THE DISCLOSURE

New ethers of 3-hydroxy-$\Delta^{1,3}$-5$\alpha$-steroids, namely 3-enol ethers of $\Delta^1$-3-keto-5$\alpha$-steroids, are prepared by submitting to pyrolysis tri-ethers of 1$\alpha$,3,3-tri-hydroxy-5$\alpha$-steroids optionally in the presence of an alcohol or a phenol.

CROSS-REFERENCE TO RELATED APPLICATION

This application is a continuation-in-part of our copending application, U.S. Ser. No. 830,841, filed June 5, 1969, now abandoned; said U.S. Ser. No. 830,841 is a continuation-in-part of U.S. Ser. No. 640,419, filed May 22, 1967, now abandoned.

BACKGROUND OF THE INVENTION

The present invention relates to a process for preparing enol ethers of $\Delta^1$-3-keto-5$\alpha$-steroids and to the products obtained thereby including a series of new ethers of 3-hydroxy-$\Delta^{1,3}$-5$\alpha$-steroids of the androstane and pregnane series.

It is known that $\Delta^1$-3-keto steroids, contrary to $\Delta^4$-3-ketoisomers, do not react with alkyl orthoformates and/or alcohols in the presence of acid catalysts to give the corresponding 3 enol ethers, that is, ethers of 3-hydroxy-$\Delta^{1,3}$-diene steroids.

However, according to U.S. Pat. No. 3,249,628 $\Delta^1$-5$\alpha$-androsten-17$\beta$-ol-3-one or an ester thereof can be reacted with benzyl alcohol in the presence of an alkali metal hydroxide to give a compound to which the 3-benzyloxy-$\Delta^{1,3}$-diene structure has been ascribed. Nonetheless, we have now found that the compound actually prepared in U.S. Pat. No. 3,249,628 is 2-benzylidene-17$\beta$-hydroxy-5$\alpha$-androstan-3-one. This last mentioned compound has been described in the literature in J. Chem. Soc., 1960: 1297–1311. We have followed the procedure of U.S. Pat. No. 3,249,628 and compared the compound obtained with an authentic sample of 2-benzylidene-17$\beta$-hydroxy-5$\alpha$-androstan-3-one, prepared as described in J. Chem. Soc., 1960: 1297–1311, at page 1310. Data obtained, i.e. mixed melting points, UV and IR curves, demonstrate conclusively that these compounds are identical. Further, reduction of the compound of U.S. Pat. No. 3,249,628 identical with the ketone compound described in J. Chem. Soc., 1960: 1297–1311 with NaBH$_4$ yielded a product conclusively identified as 2-benzylidene-5$\alpha$-androstane-3$\beta$,17$\beta$-diol.

Additionally, the compound prepared as described in U.S. Pat. 3,249,628 has not been found to display any of the characteristic chemical properties of an enol ether. For example, it cannot be converted into the corresponding $\Delta^1$-3-ketone even under strong acid conditions, while it is well known that enol ethers are easily hydrolyzed to the parent ketones in the presence of acids.

Moreover, U.S. Pat. No. 3,249,628 states that the formation of enol ethers does not appear possible when the $\Delta^1$-3-ketone is treated with methyl alcohol, ethyl alcohol or cyclohexanol. Therefore, there is no method in the literature which can be generally applied to the preparation of enol ethers of $\Delta^1$-3-keto-5$\alpha$-steroids.

SUMMARY OF THE INVENTION

We have now found that enol ethers of $\Delta^1$-3-keto-5$\alpha$-steroids can be obtained by pyrolysis of new tri-ethers of 1$\alpha$,3,3-trihydroxy-5$\alpha$-steroids. We have also found that when the pyrolysis is carried out in the presence of an alcohol (or phenol) this latter enters into reaction to give an ether of a 3-hydroxy-$\Delta^{1,3}$-diene in which the etherifying group is that of the hydrocarbon radical of the reacting alcohol (or phenol). Accordingly, the present invention in one of its aspects provides a process for preparing enol ethers of $\Delta^1$-3-keto-5$\alpha$-steroids which comprises heating, in an anhydrous hydrocarbon solvent, a tri-ether of a 1$\alpha$,3,3-trihydroxy-5$\alpha$-steroid in the presence of an acid catalyst and optionally of an alcohol or phenol reagent.

The invention thus provides a new class of ethers, namely ethers of 3-hydroxy-$\Delta^{1,3}$-diene steroids, particularly of the androstane and pregnane series, which compounds may be employed as protective derivatives of the $\Delta^1$-3-keto system and therefore they are useful, like the corresponding enol ethers of $\Delta^4$-3-ketosteroids, as intermediates in steroid syntheses.

DETAILED DESCRIPTION OF THE INVENTION

The process of this invention and the products obtained thereby are represented by the following partial formulas:

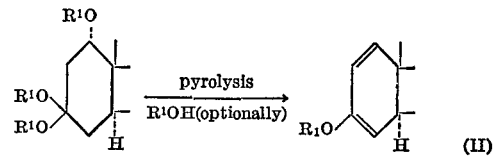

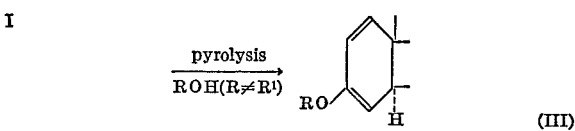

in which R$^1$ is a lower hydrocarbon radical and R is a hydrocarbon radical containing up to 9 carbon atoms.

The term "lower hydrocarbon radical" is intended to mean a lower, saturated or unsaturated, aliphatic radical containing from 1 to 6 carbon atoms such as methyl, ethyl, propyl, allyl, propargyl, butyl, pentyl and their branched isomers, or a lower cycloaliphatic radical, particularly cyclopentyl. Preferred lower hydrocarbon radicals are methyl, ethyl, propyl, allyl and propargyl; the methyl radical being particularly preferred.

The term "hydrocarbon radical" used for R refers to a saturated or unsaturated, straight or branched, aliphatic moiety containing from 1 to 9 carbon atoms, such as methyl, ethyl, propyl, isopropyl, butyl, isobutyl, tert. butyl, amyl, hexyl, heptyl, nonyl, allyl, crotyl, propargyl, a saturated or unsaturated cycloaliphatic moiety, such as cyclopropyl, cyclobutyl, cyclopentyl, cyclohexyl, cyclopent-2-enyl, cyclohex-2-enyl, cyclopentylpropyl, cycloheptyl cyclooctyl radical; an araliphatic moiety, such as benzyl, phenethyl, cynnamyl radical; or a monocyclic aromatic moiety, such as phenyl, o-tolyl or xylyl.

The starting material triethers of Formula I above are prepared by reacting the corresponding $\Delta^1$-3-keto-5$\alpha$-steroids with an alkyl orthoformate and an alcohol at moderate temperature and in the presence of an acid catalyst. A detailed preparation of the triether starting materials I is described in our application U.S. Ser. No. 640,418, filed May 22, 1967, concurrently with this application, and now U.S. Pat. No. 3,475,467.

The process of this invention comprises heating a triether of a 1$\alpha$,3,3-trihydroxy-5$\alpha$-steroid of the partial Formula I above in an inert solvent and in the presence of an acid catalyst. Under such conditions the starting triether loses two moles of alcohol and is converted into a corresponding 3-enol ether of $\Delta^1$-3-keto-5$\alpha$-steroid. The pyrolysis may be accomplished at a temperature ranging from about 60° C. to about 155° C., but preferably the reaction is carried out in a boiling hydrocarbon solvent, such as benzene, toluene, xylene and isooctane which are inert towards the process and the products of this invention.

Suitable acid catalysts are those generally employed in the preparation of enol ethers of the $\Delta^4$-3-keto-steroids, such as the aromatic sulfonic acids, e.g., benzene, p-toluene, or anthraquinone sulfonic acids, salts of organic bases with strong acids, e.g., pyridine hydrochloride or pyridine tosylate, as well as Lewis acids. Preferred acid catalyst is pyridine tosylate.

The pyrolysis can be also carried out in the presence of a reacting alcohol which participates in the reaction but it is not determinative for the formation of the enol ether structure. By employing an alcohol which contains the same ether radical $R^1$ of the starting 1$\alpha$,3,3-tri-ether, the resulting enol ether corresponds to the ether of the starting material. If the pyrolysis is effected in the presence of an alcohol of formula ROH ($R \neq R^1$) the resulting enol ether contains the radical R of the alcohol employed. This procedure so permits to obtain any desired enol ether of a $\Delta^1$-3-keto-5$\alpha$-steroid.

The alcohol (or phenol) which may be used as reaction component is generally employed in an amount from about 0.5 to about 5 cc./gram of starting material.

According to a preferred embodiment of this invention, the reaction mixture containing the acid catalyst and the 1$\alpha$,3,3-tri-ether starting material (dissolved in one of the above mentioned anhydrous hydrocarbon solvents) with or without the alcohol reagent, is heated at boiling for a period from about 30 minutes to about 150 minutes. It is advisable during the reaction to distill off a part of the solvent, so that the alcohol which develops during the pyrolysis can be easily removed. The reaction mixture is then worked in the usual manner, for example it is made slightly alkaline by addition of a weak organic base, such as pyridine, and the solvent eliminated, preferably under vacuum. The resulting enol ether contained in the residue is suitably purified by crystallization.

The process of the present invention can be carried out on ethers of any 1$\alpha$,3,3-tri-hydroxy-5$\alpha$-steroids of the androstane, pregnane, colestane and sapogenine series. Preferred starting materials are triethers of 1$\alpha$,3,3-trihydroxy-5$\alpha$-steroids of the androstane and pregnane series, particularly the 1$\alpha$,3,3-trimethoxy-5$\alpha$-steroids of the androstane and pregnane series. Possible substituents present in the steroid nucleus, such as keto groups, halogens, methyl or methylene groups, epoxy groups in one or more of the 5,6,7,8,9,11,12,16,17 positions do not affect in any manner the pyrolysis. Possible double bonds at ring C and D do not interfere with the process of the invention. However, in general, it is preferable to block a secondary 17$\beta$-hydroxy group in the form of esters. The hydroxy group may be easily restored by deacylation.

According to another preferred embodiment of this invention there is prepared a series of new enol ethers of $\Delta^1$-3-keto-5$\alpha$-steroids of general formulas

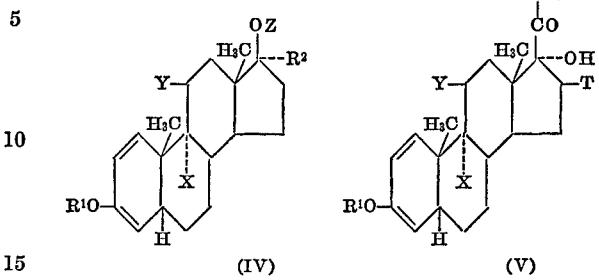

(IV)            (V)

in which $R^1$ is a lower hydrocarbon radical, Y represents hydrogen, a ketonic oxygen or a $\beta$-hydroxy group, X represents hydrogen or fluorine, T is hydrogen, $\alpha$-CH$_3$, $\beta$-CH$_3$ or $\alpha$-OZ, Z represents hydrogen or an acyl group derived from a carboxylic acid containing up to 9 carbon atoms and $R^2$ is hydrogen or lower alkyl and in which X is fluorine only when Y is $\beta$-hydroxy.

The acyl groups derived from carboxylic acids containing up to 9 carbon atoms include saturated and unsaturated aliphatic acyl, benzoyl, substituted benzoyl, arylaliphatic acyl, cycloaliphatic acyl and cycloalkyl aliphatic acyl. Representative esters are the acetate, propionate, trimethylacetate, butyrate, isobutyrate, valerate, caproate, oenanthate, benzoate, phenylpropionate, cyclopentylpropionate and cyclohexylacetate.

The new enol ethers prepared by the process of this invention, particularly those of Formulas IV and V above, have great practical importance as steroid intermediates. They are stable towards reducing agents such as alkali metal borohydrides and lithium aluminum hydride and are easily hydrolyzed into $\Delta^1$-3-keto-5$\alpha$-steroids by treatment with an acid. Generally, for the hydrolysis the new enolethers are dissolved in a small amount of methanol and dilute hydrochloric acid is added. Therefore, the new enol ethers of this invention afford a valuable protection of the $\Delta^1$-3-keto group, when reductions of ketogroups to hydroxy groups in other portions of the steroid molecule are required, as for example in the preparation of 11-hydroxy substituted-$\Delta^1$-3-keto steroids by the reduction of the corresponding 11-keto compounds. Processing steps for such a preparation would include: formation of the tri-ether starting materials as described in our copending application Ser. No. 640,418, now U.S. pat. No. 3,475,467; pyrolysis to the $\Delta^{1,3}$-3-enol ethers of the instant application; reduction of the 11-keto groups to the 11-hydroxy group; and hydrolysis of the enol ether to restore the $\Delta^1$-3-keto configuration in the A-ring. The following known androstane derivatives reported in N-Applezweig's "Steroid Drugs," vol. 1, 1962, to have androgenic activity, contain the $\Delta^1$-3-keto configuration and could be advantageously prepared utilizing the intermediates and processes of the instant invention:

3-oxo-11$\beta$,17$\beta$-dihydroxy-$\Delta^1$-androstene
  (Cat. No. 179, p. 471, from the corresponding 11-keto product, Cat. No. 178, p. 470);
3-oxo-11$\beta$,17$\beta$-dihydroxy-17$\alpha$-methyl-$\Delta^1$-androstene
  (Cat. No. 181, p. 471, from the corresponding 11-keto product, Cat. No. 180, p. 471);
3-oxo-11$\beta$,17$\alpha$-dihydroxy-17$\alpha$-ethyl-$\Delta^1$-androstene
  (Cat. No. 183, p. 471, from the corresponding 11-keto product, Cat. No. 182, p. 471).

Further, in "Steroid Drugs," vol. II by N. Applezweig, Holden-Day, Inc., San Francisco, 1964, the following compound, reported to have androgenic and anabolic activity, also has the A-ring configuration described:

9$\alpha$-fluoro-17$\alpha$-methyl-$\Delta^1$-androstene-11$\beta$,17$\beta$-diol-3-one
  (Cat. No. 2170, p. 147, from the corresponding 11-keto product Cat. No. 2171, p. 147).

Following the same reasoning as above, the 11-hydroxy-substituted-$\Delta^1$-3-keto-5α-pregnene end product, is reported in J. Am. Chem. Soc. 77: 3166–7 (1955), 9α-fluoro-11β,17β,21-trihydroxy-5α-pregn-1-ene-3,20-dione 21 - acetate, which is stated to have about 60% of the activity of hydrocortisone acetate by the one day mouse liver glycogen assay, can advantageously be prepared from the corresponding 11-keto product by utilizing the processes and intermediates of the instant invention.

In addition, in Vol. II of N. Applezweig's "Steroid Drugs," the following 11-hydroxy-$\Delta^1$-3-keto-5α-pregnene derivative is reported to have corticoid activity:

$\Delta^1$-5α-pregnene-11α,21-diol-3,20-dione
(Cat. No. 2680, p. 260, from the corresponding 11-keto product, Cat. No. 2681, p. 260).

Furthermore, the $\Delta^{1,3}$-3-enol ethers of this invention possess an activated hydrogen atom in the 4 position, and therefore are useful for the preparation of 4-substituted, for example of 4-halo-substituted-$\Delta^1$-3-keto-5α-steroids.

The reaction is carried out by dissolving the $\Delta^{1,3}$-enol ethers of this invention in acetone, optionally adding other acetone miscible solvents (e.g. dioxane) to favour the solution of the compound, and treating the resulting solution, previously buffered by addition of aqueous sodium acetate, with an excess of N-bromosuccinimide and acetic acid at low temperature (about 0° C.). The reaction mixture is then poured into ice-water, and the desired 4-bromo-$\Delta^1$-3-keto-5α-compound is isolated either by direct filtration, if it precipitates, or by extraction with a suitable solvent after partial or total concentration of the solution. The same reaction could, of course, be carried out using N-chlorosuccinimide, to obtain the 4-chloro-$\Delta^1$-3-keto-5α-compounds. The halogenation reaction is essentially the same as known procedures used for the conversion of $\Delta^3$-3-enolether steroid into 4-halo-3-keto derivative as reported in German Pat. No. 1,182,658, Example 5. When utilizing this reaction on the $\Delta^{1,3}$-3-enolethers of this invention, the 4-halo-$\Delta^1$-3-keto-5α-derivatives obtained are generally a mixture of 4α- and 4β-halo derivatives, which, if desired, may be separated by fractional crystallization. In practice, however, the mixture is directly used for the further conversion into $\Delta^{1,4}$-3-keto-compound by dehydrohalogenation according to classical methods, i.e., by reaction with organic bases such as pyridine, collidine, lutidine or by treatment with semicarbazide, as described by Fieser and Fieser in "Steroids," 1959, pages 293, 294, 687, and 689; and in N. Applezweig's "Steroid Drugs," 1962, pages 66, 67 and 72. Another method involves reaction with lithium halide and lithium carbonate according to procedures well known in the art.

As an example of a 4-halogenated-$\Delta^1$-androstene of known utility, which can be prepared as described above, there may be mentioned 4-bromo-1-androsten-17β-ol-3-one 17-(β-cyclohexylpropionate), disclosed in German Pat. 1,215,701 (column 4, Formula III) as being an intermediate in the preparation of the corresponding anabolically active $\Delta^{1,4}$-3-keto compound.

As an example of a known 4-halo-$\Delta^1$-3-keto-5α-pregnene compound which can be obtained by treatment of the $\Delta^{1,3}$-3-enol ether derivatives of this invention, there can be named: 4-bromo-1-pregnene-17α,21-diol-3,11,20-trione 21-acetate (disclosed in U.S. 2,904,564, column 2, first structure) an intermediate in the preparation of 1,4-pregnadiene-17α,21-diol-3,11,20-trione, which is stated to be effective in the treatment of arthritic conditions.

In general, the biological activities and utility of the $\Delta^{1,4}$-3-keto steroids are well known in the art, as shown by numerous references to such compounds published in Applezweig's "Steroid Drugs," vol. I, pages 599 to 606, 693 through 719; and vol. II, pages 396 through 438.

Preparation of tri-ether starting material

The preparation of a representative 1α,3,3-trimethoxy-5α-steroid is given below, using the procedure described in our copending U.S. Ser. No. 640,418, filed May 22, 1967, now U.S. Pat. No. 3,475,467.

A mixture of 7.68 g. of $\Delta^1$-5α-androsten-17β-ol-3-one 17-acetate, 15 cc. of absolute methanol, 5 cc. of methyl orthoformate and 70 mg. of p-toluensulfonic acid is maintained under stirring at room temperature for about an hour and, after addition of a few drops of pyridine, is kept in an ice-box for a further hour. The crystalline precipitate is filtered and 4.12 g. of 1α,3,3-trimethoxy-5α-androstan-17β-ol 17-acetate are obtained. M.P. 101–103° C. (dec.); $[\alpha]_D^{22}=+30°$ (dioxane, c.=0.5%). The mother liquor maintained in ice-box for a further hour, gives another 1.77 g. of 1α,3,3-trimethoxy-5α-androstan-17β-ol-17-acetate M.P. 102° C.

EXAMPLE 1

To 10 mg. of pyridine tosylate dissolved in little methanol there were added 250 cc. of isooctane and 50 cc. of solvent were distilled. To the boiling solution there were added 2 g. of 1α,3,3-trimethoxy-17β-acetoxy-5α-androstane and the solution was distilled until a small volume remained. Then a few drops of pyridine were added and the solvent was completely eliminated under vacuum. The crystalline residue, taken up with little methanol and filtered, gave 1.1 g. of 3-methoxy-17β-acetoxy-$\Delta^{1,3}$-5α-androstadiene (3-methyl-enolether of $\Delta^1$-5α-androsten-17β-ol-3-one acetate), M.P. 123–125° C., $[\alpha]_D^{22}=-0.5°$ (dioxane, c.=0.5%).

In order to confirm the 3-methoxy-$\Delta^{1,3}$-diene structure the product so obtained was submitted to catalytic hydrogenation until hydrogen was consumed in the ratio of two moles for each mole of the starting material. The 3β-methoxy-17β-acetoxy-5α-androstane was obtained, identical to the product obtained by catalytic hydrogenation of the 3-methyl-enolether of testosterone acetate.

EXAMPLE 2

A solution of 5 mg. of pyridne tosylate, 2 cc. of benzyl alcohol and 300 cc. of benzene was distilled until about 50 cc. of solvent were removed. Then 1 g. of 1α,3,3-trimethoxy-17β-acetoxy-5α-androstane was added and the distillation was carried out for about 30 minutes. By operating as described in Example 1, the 3-benzyloxy-17β-acetoxy-$\Delta^{1,3}$-5α-androstadiene (3-benzyl-enol ether of $\Delta^1$-5α-androsten-17β - ol - 3-one acetate) was obtained. M.P. 148–151° C.; $[\alpha]_D^{22}=+27°$ (dioxane, c.=0.5%). UV. ε 219=4542, ε 274–275=2035 (ethanol) IR: $\nu_{max}=$ 1728, 1638, 1590, 1573, 1497, 1294, 1037, 750, 735 and 702 cm.$^{-1}$ (the compound prepared according to Example 2 of the U.S. Pat. 3,249,628 shows a melting point of 216, 5–218° C.).

In order to confirm the characteristics of this enol ether, the product was dissolved in little methanol and treated with dilute hydrochloric acid. After 15 minutes at room temperature the hydrolysis was complete and the 17β-acetoxy-$\Delta^1$-5α-androsten-3-one formed, identical to the product described in literature (Ber. 73, 206; 1940).

555 mg. of the 3-benzyloxy-$\Delta^{1,3}$-5α-androstadien-17β-ol acetate obtained as described above were dissolved in 20 cc. of anhydrous ether and the solution was dropped into a suspension of 1 g. of lithium aluminum hydride in 20 cc. of anhydrous ether. The mixture was maintained under reflux for an hour, then, after addition of an excess of ethyl acetate and water, it was extracted with ether and the ethereal extracts were evaporated under vacuum. The residue, taken up with methanol and filtered, gave 300 mg. of 3-benzyloxy-$\Delta^{1,3}$-5α-androstadien-17β-ol; M.P. 126–129° C.; $[\alpha]_D^{22}=+31°$ (dioxane, c.=0.5%); UV: ε 219=4272, ε 273–274=2151 (ethanol) IR: $\nu_{max}$=3150, 1698, 1594, 1575, 1500, 1082, 1040, 755, 745 and 705 cm.$^{-1}$. (The compound prepared according to Example 1 of the U.S. Pat. 3,249,628 shows the following characteristics: m. pt. 191–193° C.; ε 223=6600; ε 291=17,300.)

The 3-benzyloxy-$\Delta^{1,3}$-5α-androstadien - 17β - ol so obtained was dissolved in methanol and treated with dilute hydrochloric acid. After 5 minutes at boiling, the $\Delta^1$-5α- androsten-17β - ol - 3 - one was obtained, identical to the product described in literature (Ber. 73, 206; 1940). This product is an active anabolic agent showing an anabolic androgenic ratio six times greater than that of 5α-androstane-17β-ol-3-one alone (see International Congress on Hormonal Steriods, Milan, Italy, May 14–19, 1962, Excerpta medica—International Congress Series, No. 51, page 68, abstract 62).

EXAMPLE 3

2 g. of raw 1α,3,3-triallyloxy-17β-acetoxy - 5α - androstane, obtained by treating the 17β-acetoxy-Δ¹-5α - androsten-3-one with ethyl orthoformate and allyl alcohol, were dissolved in 100 cc. of benzene and treated with 20 mg. of p-toluenesulfonic acid. The mixture was distilled until small volume, then treated as described in Example 1 to give the 3-allyloxy-17β-acetoxy-Δ¹,³ - 5α-androstadiene; M.P. 84–86° C.; $[\alpha]_D^{22}=+16°$ (dioxane, c.=0.5%).

EXAMPLE 4

Following the procedure described in Example 2, by submitting the 1α,3,3-trimethoxy-17β-acetoxy-5α - androstane to pyrolysis in the presence of n-amyl alcohol, cyclopentyl alcohol and propargyl alcohol, the following new enol-ethers of 17β-acetoxy-Δ¹-5α-androsten - 3 - one were obtained:

3-n-amyloxy-17β-acetoxy-Δ¹,³ - 5α - androstadiene; M.P. 85–87° C., $[\alpha]_D^{22}=+11°$ (dioxane, c.=0.5%);
3-cyclopentyloxy-17β-acetoxy-Δ¹,³-5α-androstadiene; M.P. 114–116° C., $[\alpha]_D^{22}=+22°$ (dioxane, c.=0.5%);
3-propargyloxy-17β-acetoxy-Δ¹,³-5α-androstadiene; M.P. 118–120° C., $[\alpha]_D^{22}=+10°$ (dioxane, c.=0.5%).

In Table I there are reported other examples of preparation of Δ¹,³-5α-androstadienes obtainable according to the procedure set forth in the Examples 1–4.

crystalline residue, taken up with methanol, gave 1,1 g. of 3-methoxy-Δ¹,³-5α-pregnadiene - 17α,21 - diol - 11,20-dione 21 - acetate; M.P. 195–205° C., $[\alpha]_D^{22}=+98°$ (dioxane, c.=0.5%).

Analogously the 3-methoxy - 17α - acetoxy - Δ¹,³ - 5α-pregnadien-20-one was obtained.

EXAMPLE 34

To 10 mg. of pyridine tosylate dissolved in little methanol there were added 250 cc. of isooctane and 50 cc. of solvent were distilled off. To the boiling solution there were added 2 g. of 1α,3,3-trimethoxy - 9α - fluoro - 5α-pregnane 11β,16α,17α,21-tetrol - 20 - one and the reaction mixture was handled as in Example 1 to give the 3-methoxy-9α-fluoro-Δ¹,³ - 5α - pregnadiene - 11β,16α,17α,21-tetrol-20-one.

Analogously, starting from the 1α,3,3 - trimethoxy - 9α-fluoro-16α,21-diacetoxy-5α-pregnane - 11β,17α - diol - 20-one; the 3-methoxy-9α-fluoro-16α,21-diacetoxy-Δ¹,³ - 5α-pregnadiene-11β,17α-diol-20-one was obtained.

EXAMPLE 35

A mixture of 2 g. of 1α,3,3-trimethoxy - 16β - methyl-5α-pregnane-11β,17α,21-triol-20-one, 10 mg. of p-toluenesulfonic acid, 2 cc. of methanol and 250 cc. of toluene worked as described in Example 34 gave the 3-methoxy-16β-methyl-Δ¹,³-5α-pregnadiene-11β,17α,21-triol-20-one.

Analogously, the 3-methoxy - 16α - methyl - Δ¹,³ - 5α-pregnadiene-11β,17α,21-triol-20-one was obtained.

EXAMPLE 36

A mixture of 2 g. of 1α,3,3-trimethoxy-9α,11β-dichloro-17α-acetoxy-5α - pregnan - 20 - one, 10 mg. of pyridine tosylate, 2 cc. of methanol and 250 cc. of isooctane

TABLE I

| Example No. | Starting compound | Hydroxy compound | Final product |
| --- | --- | --- | --- |
| 5 | 1α,3,3-triethoxy-17β-acetoxy-5α-androstane | Ethanol | 3-ethoxy-17β-acetoxy-Δ¹,²,5α-androstadiene. |
| 6 | 1α,3,3-trimethoxy-17β-acetoxy-5α-androstane | n-Propanol | 3-n-propoxy-17β-acetoxy-Δ¹,³-5α-androstadiene. |
| 7 | do | Isopropanol | 3-isopropoxy-17β-acetoxy-Δ¹,³-5α-androstadiene. |
| 8 | do | n-Butanol | 3-n-butoxy-17β-acetoxy-Δ¹,³-5α-androstadiene. |
| 9 | do | 2-methylpentanol | 3-(2'-methyl)-pentyloxy-17β-acetoxy-Δ¹,³-5α-androstadiene. |
| 10 | do | 4-methylpentanol | 3-(4'-methyl)-pentyloxy-17β-acetoxy-Δ¹,³-5α-androstadiene. |
| 11 | do | n-Hexanol | 3-n-hexyloxy-17β-acetoxy-Δ¹,³-5α-androstadiene. |
| 12 | do | n-Heptanol | 3-n-heptyloxy-17β-acetoxy-Δ¹,³-5α-androstadiene. |
| 13 | do | n-Octanol | 3-n-octyloxy-17β-acetoxy-Δ¹,³-5α-androstadiene. |
| 14 | do | Cyclohexanol | 3-cyclohexyloxy-17β-acetoxy-Δ¹,³-5α-androstadiene. |
| 15 | do | Cycloheptanol | 3-cycloheptyloxy-17β-acetoxy-Δ¹,³-5α-androstadiene. |
| 16 | do | Phenol | 3-phenoxy-17β-acetoxy-Δ¹,³-5α-androstadiene. |
| 17 | do | p-Cresol | 3-(4'-methyl)-phenoxy-17β-acetoxy-Δ¹,³-5α-androstadiene. |
| 18 | 1α,3,3-trimethoxy-17β-propionoxy-5α-androstane | Methanol | 3-methoxy-17β-propionoxy-Δ¹,³-5α-androstadiene. |
| 19 | 1α,3,3-trimethoxy-17β-cyclohexyl-acetoxy-5α-androstane | do | 3-methoxy-17β-cyclohexyl-acetoxy-Δ¹,³-5α-androstadiene. |
| 20 | 1α,3,3-trimethoxy-17β-(β-phenyl)-propionoxy-5α-androstane | do | 3-methoxy-17β-(β-phenyl)-propionoxy-Δ¹,³-5α-androstadiene. |
| 21 | 1α,3,3-trimethoxy-17β-trimethyl-acetoxy-5α-androstane | do | 3-methoxy-17β-trimethylacetoxy-Δ¹,³-5α-androstadiene. |
| 22 | 1α,3,3-trimethoxy-17β-butyroxy-5α-androstane | do | 3-methoxy-17β-butyroxy-Δ¹,³-5α-androstadiene. |
| 23 | 1α,3,3-trimethoxy-17β-valeroxy-5α-androstane | do | 3-methoxy-17β-valeroxy-Δ¹,³-5α-androstadiene. |
| 24 | 1α,3,3-trimethoxy-17β-caproyloxy-5α-androstane | do | 3-methoxy-17β-caproyloxy-Δ¹,³-5α-androstadiene. |
| 25 | 1α,3,3-trimethoxy-17β-benzoyloxy-5α-androstane | do | 3-methoxy-17β-benzoyloxy-Δ¹,³-5α-androstadiene. |
| 26 | 1α,3,3-trimethoxy-17β-(β-cyclopentyl)-propionoxy-5α-androstane | do | 3-methoxy-17β-(β-cyclopentyl)-propionoxy-Δ¹,³-5α-androstadiene. |
| 27 | 1α,3,3-trimethoxy-17α-methyl-5α-androstan-17β-ol | do | 3-methoxy-17α-methyl-Δ¹,³-5α-androstadien-17β-ol. |
| 28 | do | Cyclopentanol | 3-cyclopentyloxy-17α-methyl-Δ¹,³-5α-androstadien-17β-ol. |
| 29 | 1α,3,3-trimethoxy-17β-acetoxy-5α-androstan-11β-ol | Methanol | 3-methoxy-17β-acetoxy-Δ¹,³-5α-androstadien-11β-ol. |
| 30 | 1α,3,3-trimethoxy-9α-fluoro-17β-acetoxy-5α-androstan-11β-ol | do | 3-methoxy-9α-fluoro-17β-acetoxy-Δ¹,³-5α-androstadien-11β-ol. |
| 31 | 1α,3,3-trimethoxy-9α-fluoro-17α-methyl-5α-androstane-11β,17β-diol | do | 3-methoxy-9α-fluoro-17α-methyl-Δ¹,³-5α-androstadiene-11β 17β-diol. |
| 32 | 1α,3,3-trimethoxy-17α-ethyl-5α-androstan-17β-ol | do | 3-methoxy-17α-ethyl-Δ¹,³-5α-androstadien-17β-ol. |

EXAMPLE 33

To 20 mg. of pyridine tosylate in 2 cc. of methanol were added 250 cc. of isooctane and about 50 cc. of solvent were distilled. To the boiling solution 2 g. of 1α,3,3-trimethoxy-5α-pregnane-17α,21-diol - 11,20 - dione - 21-acetate were added and the distillation was continued for about 20 minutes. Then a few drops of pyridine were added and the solvent was eliminated under vacuum. The worked as described in Example 34 gave the 3-methoxy-9-11β-dichloro-17α-acetoxy-Δ¹,³-5α-pregnadien-29-one.

Analogously, the 3-methoxy-9α - bromo - 11β - chloro-17α-acetoxy-Δ¹,³-5α-pregnadien-20-one was obtained.

In the Table II there are reported other examples of preparation of Δ¹,³-5α-pregnadienes obtainable according to the procedure set forth in the Examples 33–36.

TABLE II

| Example No. | Starting compound | Hydroxy compound | Final product |
|---|---|---|---|
| 37 | 1α,3,3-trimethoxy-16β-methyl-21-acetoxy-5α-pregnane-11β,17α-diol-20-one. | Methanol | 3-methoxy-16β-methyl-21-acetoxy-Δ$^{1,3}$-5α-pregnadiene-11β,17α-diol-20-one. |
| 38 | do | Allyl alcohol | 3-allyloxy-16β-methyl-21-acetoxy-Δ$^{1,3}$-5α-pregnadiene-11β,17α-diol-20-one. |
| 39 | do | Propargyl alcohol | 3-prpargyloxy-16β-methyl-21-acetoxy-Δ$^{1,3}$-5α-pregnadiene-11β,17α-diol-20-one. |
| 40 | 1α,3,3-trimethoxy-16β-methyl-21-valeroxy-5α-pregnane-11β,17α-diol-20-one. | Methanol | 3-methoxy-16β-methyl-21-valeroxy-Δ$^{1,3}$-5α-pregnadiene-11β,17α-diol-20-one. |
| 41 | 1α,3,3-trimethoxy-16β-methyl-21-(β-phenyl)propionoxy-5α-pregnane-11β,17α-diol-20-one. | do | 3-methoxy-16β-methyl-21-(β-phenyl)propionoxy-Δ$^{1,3}$-5α-pregnadiene-11β,17α-diol-20-one. |
| 42 | 1α,3,3-trimethoxy-16α-methyl-21-acetoxy-5α-pregnane-11β,17α-diol-20-one. | do | 3-methoxy-16α-methyl-21-acetoxy-Δ$^{1,3}$-5α-pregnadiene-11β,17α-diol-20-one. |
| 43 | do | Allyl alcohol | 3-allyloxy-16α-methyl-21-acetoxy-Δ$^{1,3}$-5α-pregnadiene-11β,17α-diol-20-one. |
| 44 | do | Propargyl alcohol | 3-propargyloxy-16α-methyl-21-acetoxy-Δ$^{1,3}$-5α-pregnadiene-11β,17α-diol-20-one. |
| 45 | 1α,3,3-trimethoxy-16α-methyl-21-(β-cyclopentyl)-propionoxy-5α-pregnane-11β,17α-diol-20-one. | Methanol | 3-methoxy-16α-methyl-21-(β-cyclopentyl)-propionoxy-Δ$^{1,3}$-5α-pregnadiene-11β,17α-diol-20-one. |
| 46 | 1α,3,3-trimethoxy-9α-fluoro-16α,21-dipropionoxy-5α-pregnane-11β,17α-diol-20-one. | do | 3-methoxy-16α,21-dipropionoxy-9α-fluoro-Δ$^{1,3}$-5α-pregnadiene-11β,17α-diol-20-one. |
| 47 | 1α,3,3-trimethoxy-9α-fluoro-16α,21-dibutyroxy-5α-pregnane-11β,17α-diol-20-one. | do | 3-methoxy-9α-fluoro-16α,21-dibutyroxy-Δ$^{1,3}$-5α-pregnadiene-11β,17α-diol-20-one. |
| 48 | 1α,3,3-trimethoxy-21-acetoxy-5α-pregnan-17α-ol-11,20-dione. | Ethanol | 3-ethoxy-21-acetoxy-Δ$^{1,3}$-5α-pregnadien-17α-ol-11,20-dione. |
| 49 | do | n-Propanol | 3-n-propoxy-21-acetoxy-Δ$^{1,3}$-5α-pregnadien-17α-ol-11,20-dione. |
| 50 | do | Isopropanol | 3-isopropoxy-21-acetoxy-Δ$^{1,3}$-5α-pregnadien-17α-ol-11,20-dione. |
| 51 | do | n-Butanol | 3-n-butoxy-21-acetoxy-Δ$^{1,3}$-5α-pregnadien-17α-ol-11,20-dione. |
| 52 | do | 2-methylpentanol | 3-(2'-methyl)-pentyloxy-21-acetoxy-Δ$^{1,3}$-5α-pregnadien-17α-ol-11,20-dione. |
| 53 | do | 4-methylpentanol | 3-(4'-methyl)-pentyloxy-21-acetoxy-Δ$^{1,3}$-5α-pregnadien-17α-ol-11,20-dione. |
| 54 | do | n-Hexanol | 3-n-hexyloxy-21-acetoxy-Δ$^{1,3}$-5α-pregnadien-17α-ol-11,20-dione. |
| 55 | do | n-Heptanol | 3-n-heptyloxy-21-acetoxy-Δ$^{1,3}$-5α-pregnadien-17α-ol-11,20-dione. |
| 56 | do | n-Octanol | 3-n-octyloxy-21-acetoxy-Δ$^{1,3}$-5a-pregnadien-17α-ol-11,20-dione. |
| 57 | do | Cyclohexanol | 3-cyclohexyloxy-21-acetoxy-Δ$^{1,3}$-5α-pregnadien-17α-ol-11,20-dione. |
| 58 | do | Cycloheptanol | 3-cycloheptyloxy-21-acetoxy-Δ$^{1,3}$-5α-pregnadien-17α-ol-11,20-dione. |
| 59 | do | Phenol | 3-phenoxy-21-acetoxy-Δ$^{1,3}$-5α-pregnadien-17α-ol-11,20-dione. |
| 60 | do | p-Cresol | 3-(4'-methyl)-phenoxy-21-acetoxy-Δ$^{1,3}$-5α-pregnadien-17α-ol-11,20-dione. |

EXAMPLE 61

Halogenation 5 g. of 3-methoxy-17β-acetoxy-Δ$^{1,3}$-5α-androstadiene was dissolved in 200 cc. of acetone-dioxane (1:1) containing 3.25 g. of sodium acetate dissolved in 25 cc. of water and the mixture cooled to 0° C.

2.85 g. of N-chlorosuccinimide, immediately followed by 2.25 cc. of glacial acetic acid, was added and the mixture stirred for 90 minutes at 0–5° C. and poured into 500 cc. of ice-water. The solvent was evaporated and the residue was taken up with hexane and filtered to give a mixture of 4α- and 4β-chloro-17β-acetoxy-Δ$^1$-5α-androsten-3-one. Crystallization of this mixture from methanol yielded 1.18 g. of 4α-chloro-17β-acetoxy-Δ$^1$-5α-androsten-3-one; M.P. 228–229° C., [α]$_D^{22}$=+54.5° (dioxane, c.=1%).

From the mother liquors there was obtained 1.15 g. of 4β-chloro-17β-acetoxy-Δ$^1$-5α-androsten-3-one; M.P. 180–182° C., [α]$_D^{22}$=−2.5° (dioxane, c.=1%).

In the same manner, but substituting N-bromosuccinimide for N-chlorosuccinimide, there was obtained a mixture of 4α-bromo-17β-acetoxy-Δ$^1$-5α-androsten-3-one and 4β-bromo-17β-acetoxy-Δ$^1$-5α-androsten-3-one.

EXAMPLE 62

Dehydrohalogenation 100 mg. of a mixture of 4α-bromo-17β-acetoxy-Δ$^1$-5α-androsten-3-one and 4β-bromo-17β-acetoxy-Δ$^1$-5α-androsten-3-one prepared as in Example 61 above, were added to a suspension of 100 mg. of lithium chloride and 100 mg. of lithium carbonate in 5 cc. of dimethylformamide. The reaction mixture was refluxed 30 minutes under nitrogen atmosphere, then poured in water acidified by acetic acid. The crystalline product which separated was filtered, washed with water until neutral and dried to obtain 65 mg. of a product, melting at 149–152° C., which was identical to an authentic specimen of 17β-acetoxy-Δ$^{1,4}$-androstadien-3-one prepared by another method. (Ber. 73, 451; 1940).

EXAMPLE 63

3-methoxy - 21 - acetoxy - Δ$^{1,3}$ - 5α - pregnadien-17α-ol-11,20-dione, the product of Example 33, is treated with N-chlorosuccinimide following the procedure of Example 61 to obtain 4-chloro-21-acetoxy-Δ$^1$-5α-pregnen-17α - ol - 3,11,20 - trione, which is dehydrohalogenated according to Erample 62 to obtain prednisone acetate, a known antiarthritic agent, as reported n U.S. 2,904,564.

We claim:

1. A process for the preparation of enol ethers of Δ$^1$-3-keto-5α-steroids having at the ring A the structure:

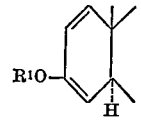

in which R$^1$ is selected from the group consisting of a saturated group having up to 6 carbon atoms in a straight or branched alkyl chain; an unsaturated aliphatic moiety selected from the gronp consisting of allyl and propargyl; and a satsrated or unsaturated cyclo-aliphatic group containing up to 6 carbon atoms; which comprises heating in an anhydrous hydrocarbon solvent and in the presence of an acid catalyst a corresponding, tri-ether of 1α,3,3-trihydroxy-5α-steroid having at the ring A the following structure:

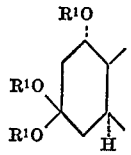

in which R$^1$ is as defined above.

2. A process as claimed in claim 1 in which the pyrolysis is carried out at a temperature from about 60 to about 155° C.

3. A process as claimed in claim 1 in which the acid catalyst is pyridine tosylate.

4. A process as claimed in claim 1 in which a 1α,3,3-trimethoxy-5α-steroid is used as starting material.

5. A process as claimed in claim 1 in which the pyrolysis is carried out in the presence of an alcohol of formula R¹OH in which R¹ is a lower hydrocarbon radical corresponding to the ether radical of the starting tri-ether.

6. A process for the preparation of enol ethers of Δ¹-3-keto-5α-steroids having at the ring A the structure:

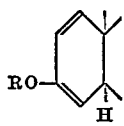

in which R is selected from the group consisting of a saturated aliphatic moiety containing up to 8 carbon atoms in a straight or branched chain; an unsaturated aliphatic moiety selected from the group consisting of allyl and propargyl; a cycloalkyl moiety containing from 3 to 8 carbon atoms inclusive; a phenyl radical; a benzyl radical; a tolyl radical; which comprises heating in an anhydrous hydrocarbon solvent in the presence of an acid catalyst and of an alcohol or phenol of formula ROH, in which R has the above meaning, a tri-ether of a 1α,3,3-trihydroxy-5α-steroid having at the ring A the structure:

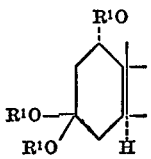

in which R¹ is a lower hydrocarbon radical different from the R radical in the final product.

7. A process as claimed in claim 6 in which the pyrolysis is carried out at a temperautre from about 60 to about 155° C.

8. A process as claimed in claim 6 in which the acid catalyst is pyridine tosylate.

9. A process as claimed in claim 6 in which a 1α,3,3-trimethoxy-5α-steroid is used as starting material.

10. A process for the preparation of 3-benzyloxy-17β-acetoxy-Δ¹,³-5α-androstadiene which comprises heating in an anhydrous hydrocarbon solvent the 1α,3,3-trimethoxy-17β-acetoxy-5α-androstane in the presence of benzyl alcohol and of an acid catalyst.

11. A process as claimed in claim 10 in which the product thus obtained is treated with lithium aluminum hydride to give 3-benzyloxy-Δ¹,³-5α-androstadien-17β-ol.

12. A compound of the formula:

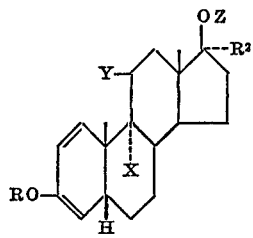

in which R is selected from the group consisting of a saturated aliphatic moiety containing up to 8 carbon atoms in a straight or branched chain; an unsaturated moiety selected from the group consisting of allyl and propargyl; a cycloalkyl moiety containing from 3 to 8 carbon atoms inclusive; a phenyl radical; and a tolyl radical; Y is selected from the group consisting of hydrogen, a ketonic oxygen and a β-hydroxy group, X is selected from the group consisting of hydrogen and fluorine, Z is selected from the group consisting of hydrogen and an acyl group derived from a carboxylic acid containing up to 9 carbon atoms, and R² is selected from the group consisting of hydrogen and lower alkyl; provided that X is fluorine only when Y is β-hydroxy; and provided that Z is acyl only when Y is hydrogen or hydroxy.

13. 3-methoxy-17β-acetoxy-Δ¹,³-5α-androstadiene.

14. 3-allyloxy-17β-acetoxy-Δ¹,³-5α-androstadiene.

15. 3-propargyloxy-17β-acetoxy-Δ¹,³-5α-androstadiene.

16. 3-n-pentyloxy-17β-acetoxy-Δ¹,³-5α-androstadiene.

17. 3-cyclopentyloxy - 17β - acetoxy-Δ¹,³-5α-androstadiene.

18. A compound of formula:

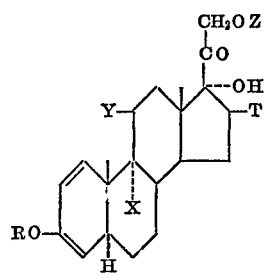

in which R is selected from the group consisting of a saturated aliphatic moiety containing up to 8 carbon atoms in a straight or branched chain; an unsaturated aliphatic moiety selected from the group consisting of allyl and propargyl; a cycloalkyl moiety containing from 3 to 8 carbon atoms inclusive; a phenyl radical; a benzyl radical; a tolyl radical; Y is selected from the group consisting of hydrogen, a ketonic oxygen and a β-hydroxy group, X is selected from the group consisting of hydrogen and fluorine, T is selected from the group consisting of hydrogen, α-CH₃, β-CH₃ and α-acyloxy wherein the acyl group contains up to 4 carbon atoms, and Z is selected from the group consisting of hydrogen and an acyl group derived from a carboxylic acid containing up to 9 carbon atoms; provided that X is fluorine only when Y is β-hydroxy; and provided that T is α-acyloxy only when Y is β-hydroxy.

19. 3 - methoxy - 21 - acetoxy - Δ¹,³ - 5α - pregnadien-17α-ol-11,20-dione.

20. 3 - methoxy - 16β - methyl - Δ¹,³ - 5α - pregnadiene-11β,17α,21-triol-20-one.

21. 3 - methoxy - 16α - methyl - Δ¹,³ - 5α - pregnadiene-11β,17α,21-triol-20-one.

22. 3 - methoxy - 9α - fluoro - Δ¹,³ - 5α - pregnadiene-11β,16α-17α,21-tetrol-20-one.

23. 3 - methoxy - 9α - fluoro - 16α,21 - diacetoxy-Δ¹,³-5α-pregnadiene-11β,17α-diol-20-one.

24. 3-benzyloxy-17β-acetoxy-Δ¹,³-5α-androstadiene having the following physical properties:

melting point: 148–151° C.; [α]$_D^{22}$=+27° (dioxane, c.=0.5%)

UV: ε 219=4542, ε274–275=2035

IR: ν$_{max}$=1728, 1638, 1590, 1573, 1497, 1249, 1037, 750, 735 and 702 cm.⁻¹ prepared by heating 1α,3,3-trimethoxy-17β-acetoxy-5α-androstane, in an anhydrous hydrocarbon solvent, in the presence of benzyl alcohol and an acid catalyst.

25. 3-benzyloxy - Δ¹,³ - 5α-androstadiene-17β-ol having the following physical properties:

melting point: 126–129° C.; [α]$_D^{22}$=+31° (dioxane, c.=0.5%)

UV: ε 219=4272, ε 273–274=2151

IR: ν$_{max}$=3150, 1698, 1594, 1575, 1500, 1082, 1040, 755, 745 and 705 cm.⁻¹ prepared by heating 1α,3,3-trimethoxy-17β-acetoxy-5α-androstane, in an anhydrous hydrocarbon solvent, in the presence of benzyl alcohol and an acid catalyst to obtain 3-benzyloxy-17β-acetoxy - $\Delta^{1,3}$ - 5α-androstadiene which is further treated with lithium aluminum hydride.

26. 3 - methoxy - 9α,11β - dichloro - 17α - acetoxy-$\Delta^{1,3}$-5α-pregnadien-20-one.

27. 3 - methoxy - 9α - bromo - 11β - chloro - 17α-acetoxy-$\Delta^{1,3}$-5α-pregnadien-20-one.

References Cited
UNITED STATES PATENTS
3,249,628  5/1966  Wiechert _____ 260—397.5

ELBERT L. ROBERTS, Primary Examiner

U.S. Cl. X.R.

260—397.47, 397.5